(12) United States Patent
Anderson et al.

(10) Patent No.: US 10,305,972 B2
(45) Date of Patent: *May 28, 2019

(54) SYSTEM FOR PROVIDING AN ISOLATED TESTING MODEL FOR DISASTER RECOVERY CAPABILITIES

(71) Applicant: HARTFORD FIRE INSURANCE COMPANY, Hartford, CT (US)

(72) Inventors: Kerry R Anderson, West Hartford, CT (US); John G Buccetti, Wallingford, CT (US); Joseph E Merola, Jr., Westbrook, CT (US); Kenneth A Saucier, Bristol, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,517

(22) Filed: Apr. 23, 2018

(65) Prior Publication Data

US 2018/0248937 A1 Aug. 30, 2018

Related U.S. Application Data

(63) Continuation of application No. 14/702,246, filed on May 1, 2015, now Pat. No. 9,973,570.

(51) Int. Cl.
*G06F 15/173* (2006.01)
*H04L 29/08* (2006.01)
(Continued)

(52) U.S. Cl.
CPC ........ *H04L 67/1002* (2013.01); *H04L 41/145* (2013.01); *H04L 43/50* (2013.01); *H04L 67/10* (2013.01); *H04L 67/1031* (2013.01); *H04L 67/1097* (2013.01); *H04L 67/28* (2013.01); *H04L 69/40* (2013.01)

(58) Field of Classification Search
CPC ..... H04L 67/1002; H04L 69/40; H04L 67/28; H04L 67/10; H04L 67/1097; H04L 67/1031; H04L 43/50; H04L 41/145
See application file for complete search history.

(56) References Cited

U.S. PATENT DOCUMENTS 9,389,961 B1 * 7/2016 Patankar ............. G06F 11/1448
2004/0199553 A1 * 10/2004 Byrne ................. H04L 67/1008
(Continued)

*Primary Examiner* — Padma Mundur
(74) *Attorney, Agent, or Firm* — McCormick, Paulding & Huber LLP

(57) ABSTRACT

A system for providing an isolated testing model for testing the disaster recovery capabilities of a streamlined backup network backing up a primary network. The primary network provides one or more users access to critical data and critical services. The system is configured to be switched between a production mode and a test mode. When the system is in the test mode, the primary network and the streamlined backup network form a live production environment and the streamlined backup network provides the one or more users access to the critical data and the critical services in the event the primary network is unable to do so. When the system is in the test mode, the streamlined backup network is removed from the live production environment by physically and logically isolating the streamlined backup network from the primary network.

20 Claims, 9 Drawing Sheets

(51) Int. Cl.
*H04L 12/24* (2006.01)
*H04L 12/26* (2006.01)
*H04L 29/14* (2006.01)

(56) References Cited

U.S. PATENT DOCUMENTS

2009/0210427 A1* 8/2009 Eidler ................. G06F 11/1484
2011/0239291 A1* 9/2011 Sotka ................. H04L 63/1408
                                                            726/14

* cited by examiner

SYSTEM FOR PROVIDING AN ISOLATED TESTING MODEL FOR DISASTER RECOVERY CAPABILITIES

CROSS REFERENCE TO RELATED APPLICATIONS

This application is a continuation of prior application Ser. No. 14/702,246, filed on May 1, 2015 and published as U.S. Patent Application Publication No. 2016/0323145, the entire contents of which are incorporated herein by reference.

TECHNICAL FIELD

The present invention relates to computer networks that provide disaster recovery capabilities, and more particularly, to enabling real time testing of disaster recovery capabilities.

BACKGROUND

Many businesses and organizations rely on computer networks to provide access to critical data and/or critical services. However, computer networks can encounter problems, such as power outages, system failures, fires and/or other disasters, which can inhibit or completely interrupt their ability to provide access to critical data and services. The inhibition, or complete interruption, of access to critical data and services is known as downtime and may result in expensive productivity losses for a business or organization. As a result, many business and organizations seek to reduce or eliminate downtime by operating both a primary network ("PN") and a disaster recovery network ("DRN") in a live production environment. A live production environment is the collection of network devices and services they provide that a business or organization relies upon for day-to-day operations and backup capabilities. A DRN is a secondary network that provides backup access to critical data and/or critical services (collectively known as disaster recovery capabilities) in the event the primary network is inhibited or completely prevented from providing access to critical data and/or critical services due to a power outage, flood, system failure and/or other disaster. DRNs are expensive to operate and maintain. Thus, DRNs must be highly reliable in their ability to provide disaster recovery capabilities in order to be cost-effective. Accordingly, many business and organizations test the ability of their DRNs to provide disaster recovery capabilities (known as a DRN's reliability).

Traditionally, the reliability of a DRN operating in a live production environment is tested by moving the DRN from the live production environment to an isolated test network. Moving a DRN from a live production environment to an isolated network is an expensive procedure that typically requires several weeks of preparation in which the physical wiring and network configurations of hundreds of network devices are altered. Further, integrating a DRN that has been moved to an isolated test network back into a live production environment often requires additional weeks to reinstate the previous physical wiring and network configurations of the altered network devices. Further still, a DRN cannot provide disaster recovery capabilities while in an isolated network. Thus, testing the reliability of a DRN by moving it to an isolated network significantly increases the risk of incurring an extended period of downtime in the event a disaster occurs.

Other methods of testing the reliability of a DRN seek to reduce the risk of downtime by replicating the backup network in hardware and/or software. However, both of these approaches are expensive as they require the use of additional computing resources.

Moreover, DRNs that have been moved to an isolated network or replicated in hardware and/or software have different configuration settings during the reliability test than in a live production environment. Thus, the results of a reliability test of a DRN using the above-mentioned methods serve only as an approximation of the reliability of that particular DRN while operating in a live production environment.

SUMMARY

In one embodiment, provided is a system for providing an isolated testing configuration for testing disaster recovery capabilities. The system includes a primary network. The primary network comprises a first data server and a first service server that provide one or more users access to critical data and critical services. The system further includes a streamlined backup network. The streamlined backup network includes a second data server and a second service server that also provide the one or more users access to the critical data and the critical services. The system can be switched between a production mode and a test mode. When the system is in the production mode, the primary network and the streamlined backup network form a live production environment, and the streamlined backup network provides the one or more users backup access to the critical data and the critical services in the event the primary network is unable provide access to the critical data and the critical services. When the system is in the test mode, the streamlined backup network is removed from the live production environment by logically and/or physically isolating the streamlined backup network from the primary network such that the ability of the streamlined backup network to provide the one or more users backup access to the critical data and the critical services can be tested. The second data server and the second service server have the same configuration in the test mode and in the production mode. The system may further include an isolation appliance and the streamlined backup network may further include one or more blocks having external network connections to the primary network by way of the isolation appliance. The second data server and the second service server may be grouped into the one or more blocks. When the system is in the test mode, the isolation appliance may prohibit the second data server and the second service server from communicating with the primary network by disabling the external network connection of each block. When the system is in the production mode, the isolation appliance may enable the second data server and the second service server to communicate with the primary network by enabling the external network connection of each block. The streamlined backup network may further include a load balancer that generates a network traffic distribution by distributing network traffic to at least one of the second data server and the second service server. The load balancer may adapt the network traffic distribution based at least in part on whether the system is in the production mode or the test mode. The first service server of the primary network and the second service server of the streamlined backup network may each include an active directory server, a domain name service server, a dynamic host configuration protocol server, and an application server. The primary network and the streamlined backup network may each further include a demilitarized zone and an internal network. A testing system may be connected to the streamlined backup network when the system is in the test mode.

In another embodiment, provided is a streamlined backup network designed to provide an isolated testing configuration for disaster recovery capabilities. The streamlined backup network includes a first data server and a first service server providing one or more users access to critical data and critical services. The streamlined backup network is configured to be connected to a primary network. The primary network includes a second data server and a second service server for providing the one or more users access to the critical data and the critical services. The streamlined backup network is configured to switch between a production mode and a test mode. When the streamlined backup network is in the production mode, the streamlined backup network is connected to the primary network to form a live production environment, and the streamlined backup network provides the one or more users backup access to the critical data and the critical services in the event the primary network is unable to provide access to the critical data and the critical services. When the streamlined backup network is in the test mode, the streamlined backup network is removed from the live production environment by logically and/or physically isolating the streamlined backup network from the primary network such that the ability of the streamlined backup network to provide the one or more users backup access to the critical data and the critical services can be tested without inhibiting the operation of the primary network. The first data server and the first service server have the same configuration in the test mode and in the production mode. The streamlined backup network may further include one or more blocks having network connections to the primary network by way of an isolation appliance. For example, the first data server and the first service server may be grouped into the one or more blocks such that when the streamlined backup network is in the test mode, the isolation appliance prohibits the first data server and first service server from communicating with the primary network by disabling the network connection of each block. When the streamlined backup network is in the production mode, the isolation appliance may enable the first data server and first service server to communicate with the primary network by enabling the network connection of each block. The streamlined backup network may further include a load balancer that generates a network traffic distribution by distributing network traffic to at least one of the second data server and the second service server. The load balancer may adapt the network traffic distribution based at least in part on whether the streamlined backup network is in the production mode or the test mode. The first service server of the streamlined backup network and the second service server of the primary network each include an active directory server, a domain name service server, a dynamic host configuration protocol server and an application server. The streamlined backup network and the primary network may each include a demilitarized zone and an internal network.

In still another embodiment, provided is a primary network designed to provide an isolated testing configuration for disaster recovery capabilities. The primary network includes a first data server and a first service server providing one or more users access to critical data and critical services. The primary network is configured to be connected to a streamlined backup network. The streamlined backup network includes a second data server and a second service server for providing the one or more users access to the critical data and the critical services. The primary network is configured to switch between a production mode and a test mode. When the primary network is in the production mode, the primary network is connected to the streamlined backup network to form a live production environment, and the streamlined backup network provides the one or more users backup access to the critical data and the critical services in the event the primary network is unable to provide access to the critical data and the critical services. When the primary network is in the test mode, the streamlined backup network is removed from the live production environment by logically and/or physically isolating the streamlined backup network from the primary network such that the ability of the streamlined backup network to provide the one or more users backup access to the critical data and the critical services can be tested without inhibiting the operation of the primary network. The second data server and the second service server of the streamlined backup network have the same configuration in the test mode and in the production mode. The streamlined backup network may further include one or more blocks having external network connections to the primary network by way of an isolation appliance. The second data server and the second service server of the streamlined backup network may be grouped into the one or more blocks. In the test mode, the isolation appliance may prohibit the primary network from communicating with the second data server and the second service server by disabling the external network connection of each block. When the primary network is in the production mode, the isolation appliance enables the primary network to communicate with the second data server and second service server by enabling the external network connection of each block. The streamlined backup network may further include a load balancer that generates a network traffic distribution by distributing network traffic to at least one of the second data server and the second service server. The load balancer may adapt the network traffic distribution based at least in part on whether the primary network is in the production mode or the test mode.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific embodiments disclosed. In the drawings.

DETAILED DESCRIPTION

Figure 1:
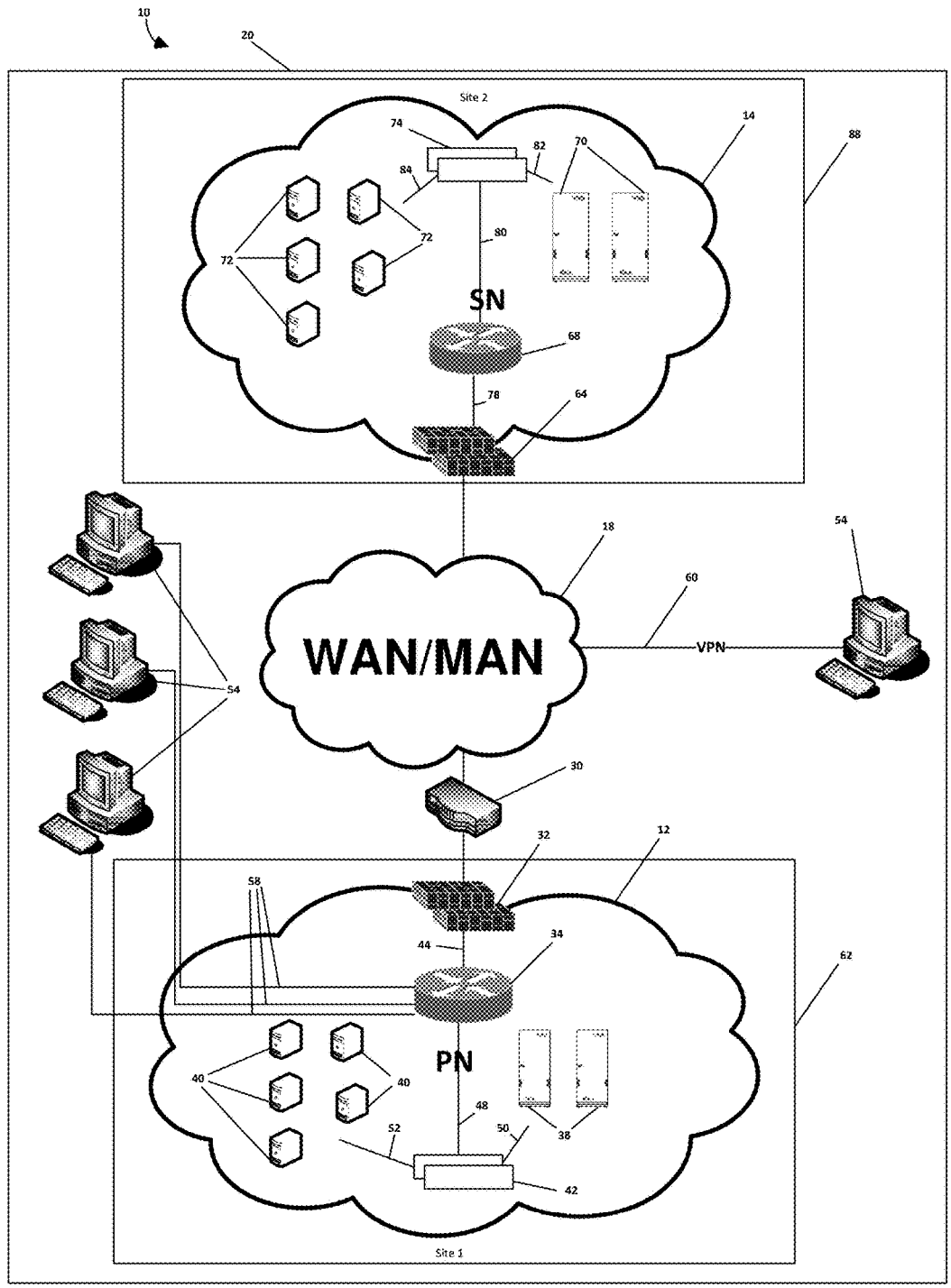
FIG. 1 is a block diagram of an exemplary system comprising a streamlined backup network in a production mode.

As previously mentioned, many business and organizations that rely on a computer network to provide access to critical data and/or critical services seek to reduce downtime caused by power outages, system failures, fires and/or other disasters by operating both a primary network and a disaster recovery network ("DRN") in a live production environment. In such live production environments, the primary network is located at a first network site and includes one or more servers that provide access to critical data and/or critical services. The DRN is typically located at a second network site and includes the same type of servers as the primary network and/or servers that are capable of replicating the servers of the primary network. Thus, in the event the primary network is unable to provide access to the critical data and the critical services due to a power outage, flood, and/or other disaster, the DRN is able to reduce the amount of downtime by providing backup access to the critical data and the critical services.

The present invention provides a computer network architecture that provides for disaster recovery capabilities and the ability to test the reliability of those capabilities at a lower cost and with improved accuracy over traditional DRNs. The present invention allows for the testing of the operation of network components/devices that provide disaster recovery capabilities under the same conditions as those that would exist should the network components/devices be called upon in a real disaster situation. In other words, the system allows testing of network components/devices, which provide disaster recovery capabilities, in a simulated disaster situation using all the same configurations as those network components/devices would have in a real disaster situation. Specifically, the present invention provides for a streamlined backup network that can be switched between a production mode and a test mode, wherein the network components/devices that comprise the streamlined backup network have approximately the same network and system configurations in the test mode as they do in the production mode.

The configuration of a network component/device includes the physical and/or logical connections of the network component/device. The configuration of a network component/device may further include the loaded software, system network settings and stored data. The configuration of a network component/device may be referred to as system settings, settings, network configuration and/or other similar expressions.

Switching the system, between the production mode and the test mode is facilitated by the ability to isolate the streamlined backup network from a live production environment without the need to manually change the wiring and system configurations of every network components/devices that comprise the streamlined network. When in the test mode, the streamlined network can be tested for reliability without inhibiting the ability of the primary network to provide access to the critical data and/or the critical services. Thus, testing the reliability of a streamlined backup network in accordance with the embodiments of the present invention disclosed herein can be accomplished in a shorter amount of time, at a lower expense and to a higher degree of accuracy than traditional DRNs.

Before the various embodiments are described in further detail, it is to be understood that the invention is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. It is also to be understood that the terminology used is for the purpose of describing particular embodiments only, and is not intended to limit the scope of the claims of the present application.

In the drawings, like reference numerals refer to like features of the systems and methods of the present application. Accordingly, although certain descriptions may refer only to certain figures and references numerals, it should be understood that such descriptions might be equally applicable to like reference numerals in other figures.

Figure 2:
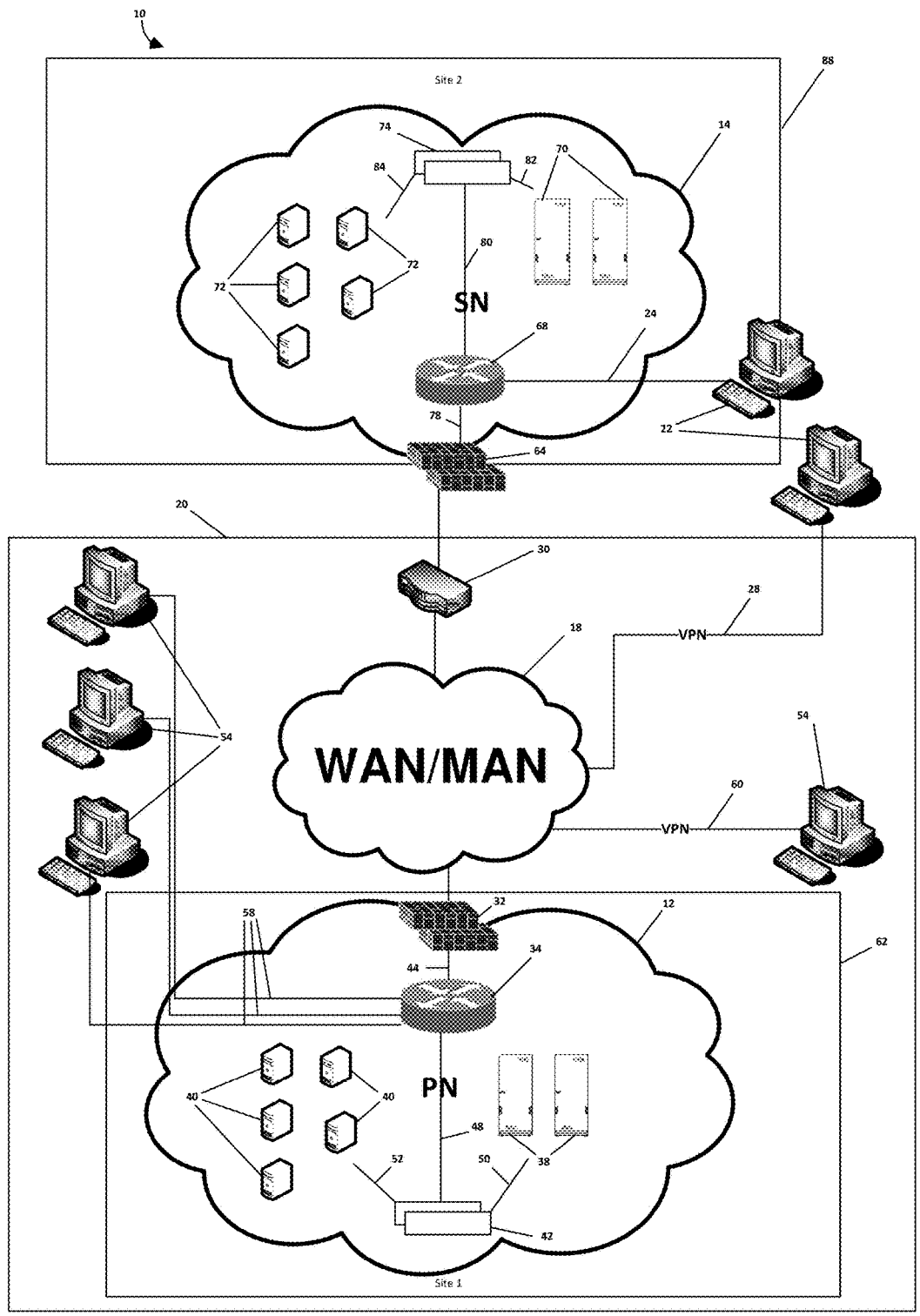
FIG. 2 is a block diagram of the system of FIG. 1 in a test mode.

FIGS. 1 and 2 show an exemplary system 10 for providing an isolated testing configuration for disaster recovery capabilities. As shown in FIGS. 1 and 2, the system 10 includes a primary network 12 and a streamlined backup network 14 in communication with each other via network 18. The system 10 may be switched between a production mode (shown in FIG. 1) and a test mode (shown in FIG. 2). As shown in FIGS. 1 and 2, the system 10 may further include an isolation appliance 30 that coordinates the switching of the system 10 between the production mode and the test mode.

As shown in FIG. 1, when the system 10 is in the production mode, the primary network 12 and the streamlined backup network 14 form a live production environment 20. When the primary network 12 and the streamlined backup network 14 form the live production environment 20, the primary network 12 provides access to critical data and services, and the streamlined backup network 14 provides access to the critical data and services in the event the primary network 12 fails and is unable to provide access to the critical data and critical services.

As shown in FIG. 2, when the system 10 is in the test mode, the primary network 12 forms the live production environment 20 and the streamlined backup network 14 is removed from the live production environment 20 by physically and/or logically isolating the streamlined backup network 14 from the primary network 12. The reliability of the streamlined network 14 may be tested by one or more testing systems 22 via a direct network connection 24 and/or a VPN connection 28. The one or more testing systems 22 may be a human tester or an automated computerized testing application executing on an at least one processor.

As also shown in FIGS. 1 and 2, the primary network 12 may include at least one gateway device 32, at least one core router/switch 34, at least one data server 38, at least one service server 40 and at least one load balancer 42. The gateway device 32 may be an external router, firewall, and/or combination thereof, which controls/polices the flow of network traffic in and out of the primary network 12. The core router/switch 34 communicates with the gateway device 32 and the load balancer 42 via network connections 44 and 48. The load balancer 42 communicates with the data servers 38 and the service servers 40 by way of network connections 50 and 52. The load balancer 42 distributes network traffic comprising critical service and/or critical data requests from the data servers 38 and the service servers 40. The data servers 38 provide one or more users 54 access to critical data and the service servers 40 provide the users 54 access to critical services. The users 54 are connected to the live production environment 20 via a direct connection 58 and/or a VPN connection 60. Although the primary network 12 is shown located at a single network site 62, the primary network 12 may be distributed across multiple network sites.

As shown in FIGS. 1 and 2, the streamlined backup network 14 includes at least one gateway device 64, at least one core router/switch 68, at least one data server 70, at least one service server 72 and at least one load balancer 74. The gateway device 64 may be an external router, firewall, and/or combination thereof, which controls/polices the flow of network traffic in and out of the streamlined backup network 14. At least some of the security policies, routing tables and/or other system configuration settings of the gateway device 64 of the streamlined backup network 14 match those of the gateway device 32 of the primary network 12. The core router/switch 68 communicates with the gateway device 64 and the load balancer 74 by way of network connections 78 and 80. The load balancer 74 communicates with the data servers 70 and the service servers 72 by way of network connections 82 and 84. The load balancer 74 distributes network traffic comprising critical service and/or critical data requests amongst the data servers 70 and the service servers 72. By distributing the network traffic, the load balancer 74 generates a network distribution. The load balancer 74 may adapt the network traffic distribution based at least in part on whether the streamlined network 14 is in the test mode or the production mode, because the streamlined backup network 14 may have different load conditions under the test mode than the production mode. The data servers 70 of the streamlined backup network 14 provide the users 54 access to the critical data normally provided by the primary network 12 in the event the primary network 12 is unable provide the users 54 access to the critical data. Similarly, the service servers 72 of the streamlined backup network 14 provide the users 54 access to the critical services normally provided by the primary network 12 in the event the primary network 12 is unable to provide the users 54 access to the critical services. Although the streamlined backup network 14 is shown located at a single network site 88, the streamlined backup network 14 may be distributed across multiple network sites.

As shown in FIGS. 1 and 2, the primary network 12 and the streamlined backup network 14 are connected via a network 18. The network 18 may be a wide area network ("WAN"), medium area network ("MAN"), and/or the Internet. The network 18 may be provided by a business or organization that operates the primary network 12 and/or the streamlined backup network 14. Alternatively, the network 18 may be provided by a party other than the business or organization that operates the primary network 12 and/or the streamlined backup network 14.

Figure 3:
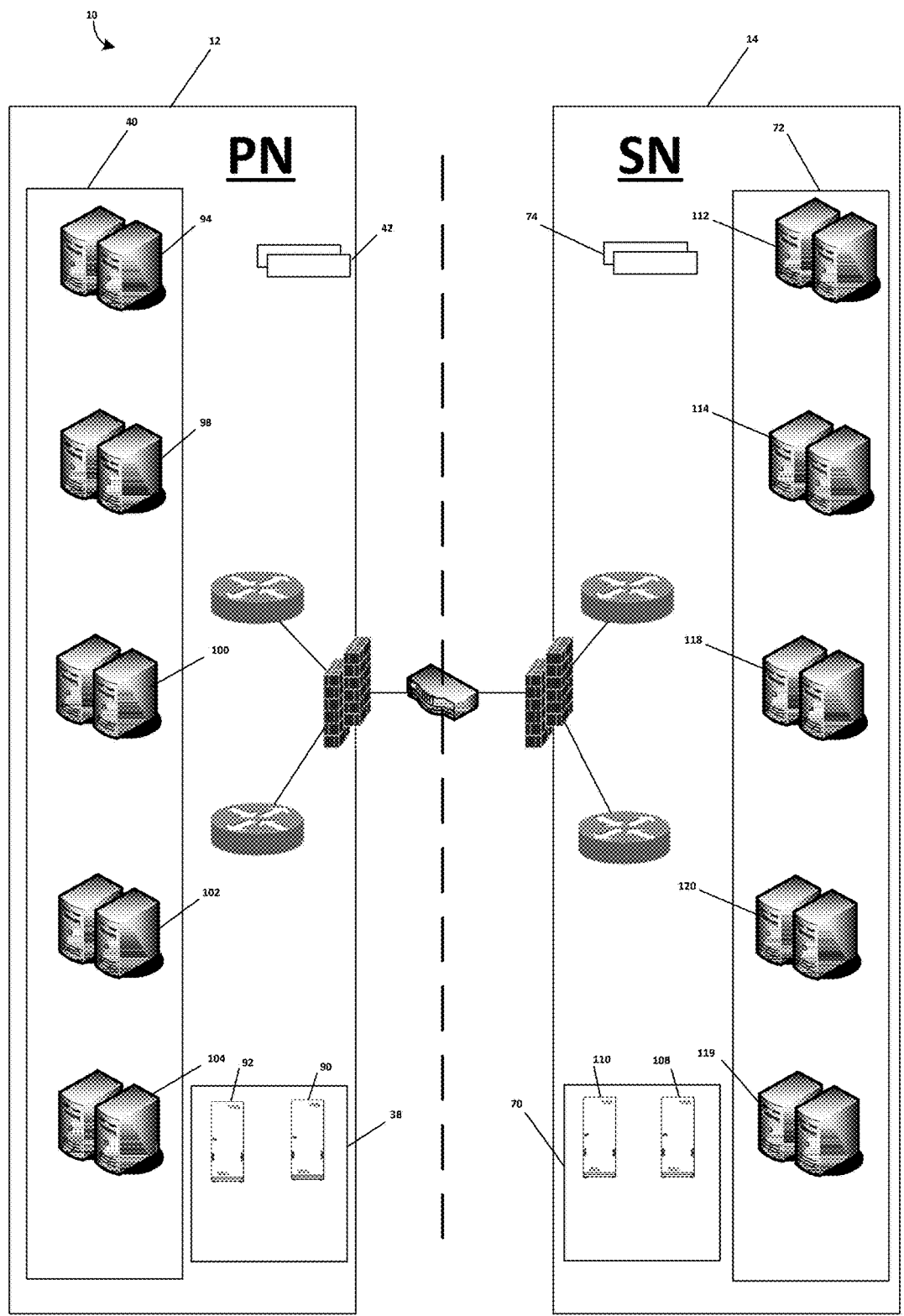
FIG. 3 is a more detailed block diagram of the system of FIG. 1.

FIG. 3 shows the different types of exemplary servers that may comprise the data 38 and service servers 40 of the primary network 12 and the data 70 and service servers 72 of the streamlined backup network 14. As shown in FIG. 3, the data servers 38 of the primary network 12 may include a network area storage ("NAS") server 90 and/or a storage area network ("SAN") server 92. The service servers 40 of the primary network 12 may include dynamic host configuration protocol ("DHCP") servers 94, dynamic name service ("DNS") servers 98, active directory ("ADS") servers 100, application servers 102 and email servers 104. The primary network 12 may further include network devices (not shown) that support the distributed file system protocol ("DFS").

As also shown in FIG. 3, the data servers 70 of the streamlined backup network 14 may include a network area storage ("NAS") server 108 and/or a storage area network ("SAN") server 110. The service servers 72 of the streamlined backup network 14 may include DHCP servers 112, DNS servers 114, ADS servers 118, application servers 120 and email servers 119. The streamlined backup network 14 may further include network devices (not shown) that support DFS. The data servers 70 of the streamlined backup network 14 may have the same hardware specifications and the same loaded software as the data servers 38 of the primary network 12. Similarly, the service servers 72 of the streamlined backup network 14 may have the same hardware specifications and the same loaded software as service servers 40 of the primary network 12.

Figure 4:
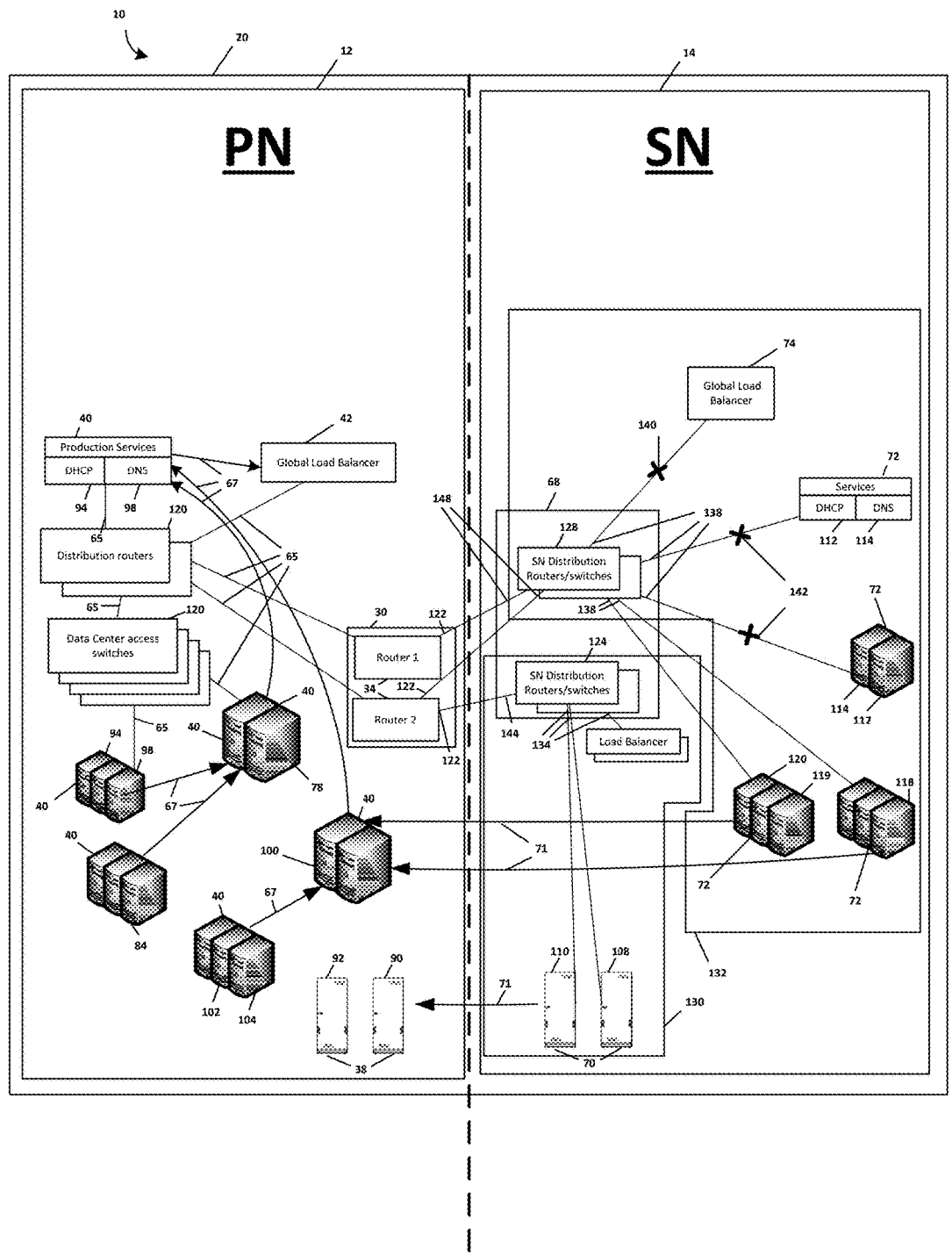
FIG. 4 is a more detailed block diagram of the system of FIG. 1 in a production mode.
Figure 5:
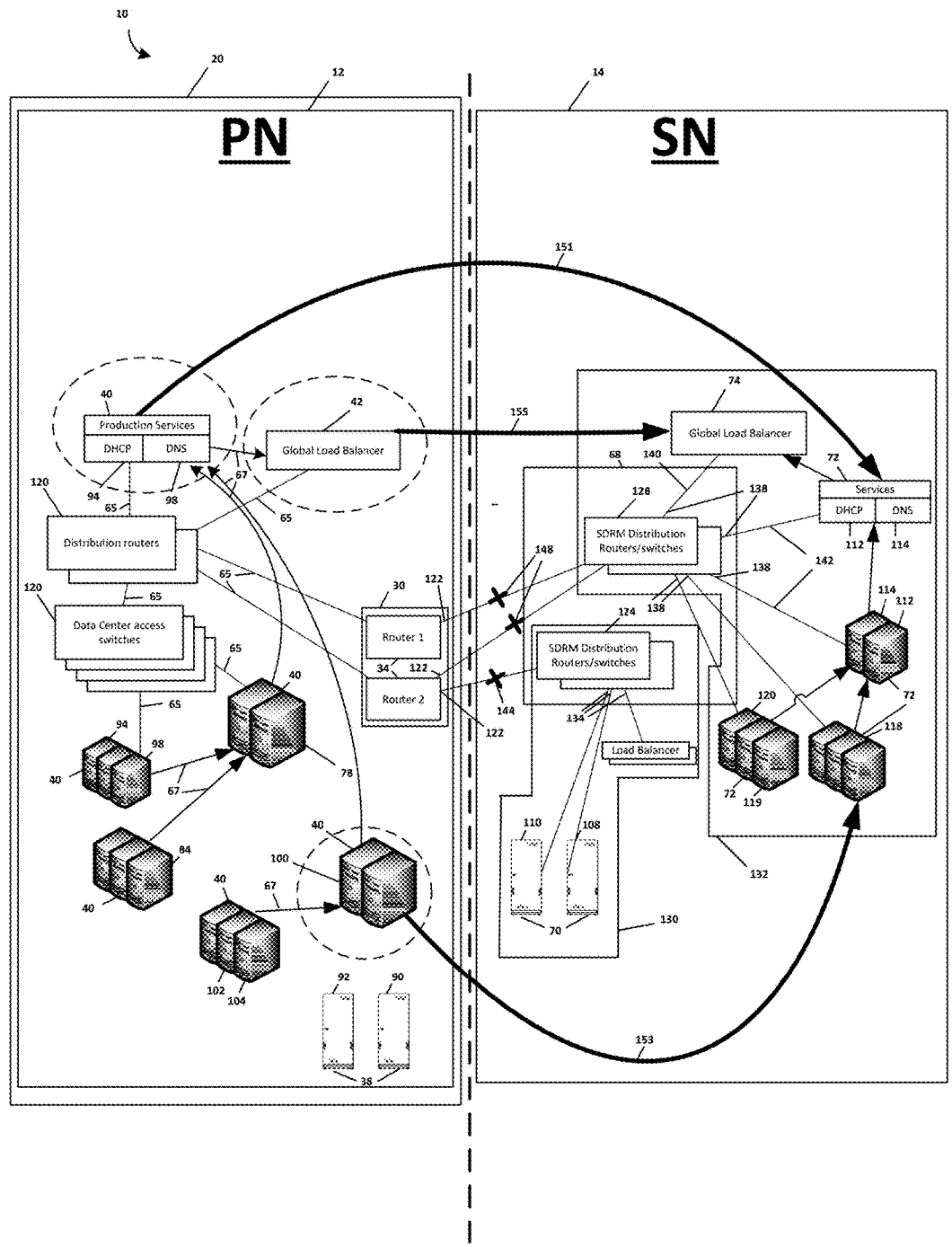
FIG. 5 is a more detailed block diagram of the system of FIG. 1 in a test mode.

FIGS. 4 and 5 show exemplary detailed block diagrams of the system 10 in the production mode (shown in FIGS. 1 and 4) and in the test mode (shown in FIGS. 2 and 5), respectively. As shown in FIGS. 4 and 5, the primary network 12 includes data 38 and service 40 servers, core routers/switches 34 and a load balancer 42. The data servers 38 may include a NAS 90 and a SAN 92. The service servers 40 may include DHCP servers 94, DNS servers 98, ADS servers 100, application servers 102 and email servers 104. The data 38 and service 40 servers may be physical and/or virtual servers. The core routers/switches 34 may serve as the isolation appliance 30.

The data 38 and service 40 servers of the primary network 12 are the primary data and service servers in the live production environment 20. Specifically, the NAS 90 and the SAN 92 provide the users (shown as 54 in FIGS. 1 and 2) access to the critical data. The DHCP servers 94 of the primary network 12 lease IP addresses to the users 54 and network components/devices that request IP addresses. The DNS servers 98 of the primary network 12 responds to all DNS queries for the live production environment 20. The ADS servers 100 of the primary network 12 are the primary domain controllers in the active directory forest (not shown) for the live production environment 20. The application servers 102 of the primary network 12 are the primary application servers that provide the users access to various applications. The email servers 104 of the primary network are the primary email servers of the live production environment 20 and provide the users email service. The load balancer 42 of the primary network 12 distributes network traffic within the primary network 12. By distributing the network traffic, the load balancer 42 generates a network distribution. The load balance 42 may adapt the network traffic distribution based at least in part on whether the streamlined backup network 14 is in the test mode or the production mode.

The core routers/switches 34 communicate with the data 38 and service servers 40 and the load balancer 42 by way of one or more distribution routers/switches 120. As shown in FIGS. 4 and 5, external network interfaces 122 of the core routers/switches 34 may communicate with the streamlined backup network 14. Alternatively, external network interfaces of the gateway device (shown as 32 in FIGS. 1 and 2) may communicate with the streamlined backup network 14 and form the isolation appliance 30. Various physical communication paths and logical communication paths between the various network components of the primary network 12 are shown by lines 65 and arrows 67, respectively.

As further shown in FIGS. 4 and 5, similar to the primary network 12, the streamlined backup network 14 includes data 70 and service 72 servers, core routers/switches 68 and a load balancer 74. The core router/switches 68 of the streamlined backup network 14 may include distribution routers/switches 124 and 128. The data servers 70 include a NAS 108 and a SAN 110. The service servers 72 include DHCP servers 112, DNS servers 114, ADS servers 118, application servers 120 and email servers 119. The data 70 and service 72 servers may be physical and/or virtual servers. The data 70 and service 72 servers are grouped into one or more blocks 130 and 132, respectively.

As referred to herein, blocks are computer network structures that include grouped network components/devices and provide for the simultaneous control over the ability of the grouped network components/devices to communicate in the live production environment 20. A block may include physical and/or virtual network components/devices such as physical and/or virtual servers. Network components/devices are grouped into a block by connecting to internal network interfaces of the block. Blocks further include at least one external network connection that allows the grouped network components/devices to communicate in the live production environment 20. When the external network connection of a block is enabled, the grouped network components/devices communicate in the live production environment 20. When the external network connection of a block is disabled, the grouped network components/devices are physically and/or logically unable to communicate in the live production environment 20.

Blocks may be implemented as one or more routers/switches, and may further be implemented as a virtual local area network ("LAN/VLAN") facilitated by the one or more routers/switches to which the grouped network components/devices are connected. The external network connection of a block may be enabled and disabled by enabling and disabling ports of an external interface of a router/switch that comprise the block. Preferably, the number of external network connections of a block should be kept at a minimum and the network components/devices grouped into a block should only be able to communicate in the live production environment 20 by way of the external network connection of the block. This insures that enabling and disabling the external network connection of the block provides simultaneous control over the ability of the grouped network/devices to communicate with the live production environment 20. Further, the external network connections of the blocks of the streamlined backup network 14 may connect into the isolation appliance 30 that in turn communicates with the primary network 12. Accordingly, the external network connection of the block may be logically and/or physically enabled and disabled at the isolation appliance 30.

Network components/devices may be grouped into blocks according to their function. For example, a block may include network components/devices related to DNS, such as DNS servers, DNS caching servers, load balancers and the routers/switches that connect the various DNS related network components/devices to a network. By disabling the external network connection of the block, the DNS related network components/devices are physically and logically prevented from communicating in the live production environment 20. By enabling the external network connection of the block, the DNS related network components/devices communicate in the live production environment 20. Similarly, a block may include network components/devices related to DHCP, such as DHCP servers, load balancers and the routers/switches that connect the various DHCP related network components/devices to a network. By disabling the external network connection of the block, the DHCP related network components/devices are physically and logically prevented from communicating in the live production environment 20. By enabling the external connection of the block, the DHCP related network components/devices communicate in the live production environment 20.

Network components/devices may be grouped into blocks according to their physical location. For example, a block may include network components/devices that are located in the same server rack, room and/or building. Also, network components/devices may be grouped into blocks according their logical location. For example, a block may include network components/devices that are related to the same group of users but are located in separate server racks, rooms and/or buildings. Thus, blocks, in combination with the isolation appliance 30, provide for a single location where the ability of all the network devices/components grouped into the blocks to communicate in the live production environment 20 can be controlled in a reliable and efficient manner.

As further shown in FIGS. 4 and 5, the data servers 70 are grouped into block 130, formed by distribution routers/switches 124, by connecting to the internal network interfaces 134 of the distribution routers/switches 124. The service servers 72 and the load balancer 74 of the streamlined backup network 14 are grouped into block 132 by connecting to the internal network interfaces 138 of the distribution routers 128 forming block 132. The load balancer 74, is connected to the distribution routers/switches 128 by VLan 140. The DNS servers 114 and DHCP server 112 are connected to the distribution routers/switches 128 by VLan 142.

As shown in FIG. 4, when the system 10 is in the production mode, the external network connections 144 and 148 of blocks 130 and 132, respectively, are enabled, thus the data 70 and service 72 servers of the streamlined backup network 14 are able to communicate with primary network 12. Accordingly, the streamlined backup network 14 forms part of the live production environment 20. Various logical communication paths between the streamlined backup network 14 and the primary network 12 are shown by arrows 71.

The data servers 70 of the streamlined backup network 14 mirror the data servers 38 of the primary network 12. Similarly, the service servers 72 of the streamlined backup network 14 mirror the service servers 40 of the primary network 12. The load balancer 74 of the streamlined backup network 14 may also mirror the load balancer 42 of the primary network 12. The external gateway device (shown as 64 in FIGS. 1 and 2) of the streamlined backup network 14 may mirror the gateway device (shown as 32 in FIGS. 1 and 2) of the primary network 12.

Mirroring is the replication of the system configuration of a first network component/device by a second network component/device. Mirroring may be accomplished by software programs that facilitate the copying of data. For example, the NAS 108 of the streamlined backup network 14 may periodically execute a computer script that instructs the NAS 108 of the streamlined backup network 14 to copy all of the data stored in the NAS 90 of the primary network 12. Mirroring may also be accomplished by copying images of network components/devices. For example, in a system where many of the data and service servers are virtual servers, a software program, such as a hypervisor control panel, may be used to take and copy images of the network components/devices of the primary network onto to the network components/devices of the streamlined backup network 14. Mirroring may also be accomplished by manually copying the data from one network component/device to another by a human using a human machine interface (e.g.; keyboard and mouse) to enter or copy data from the network component/device of the primary network 12 into the network component/device of the streamlined backup network 14.

However, the ADS server 118 of the streamlined backup network 14 does not necessarily need to mirror the ADS server 100 of the primary network 12. Rather, the ADS server 118 of the streamlined backup network 14 may be made a secondary domain controller in the active directory forest of which the ADS server 100 of the primary network 12 is the primary domain controller. Thus, the ADS server 118 of the streamlined backup network 14 receives a copy of the of the active directory forest of which the ADS server 100 of the primary network 12 is the primary domain controller of.

As previously stated, when the system 10 is in the production mode, the external network connections 144 and 148 of blocks 130 and 132, respectively, are enabled and the primary network 12 communicates with the streamlined backup network 14. In traditional DRNs, the mirroring of certain network components/devices may create conflicts between the primary network and the DRN. For example, mirroring of the DHCP server of the primary network by the DHCP server of the DRN would cause conflicts as both DHCP servers would attempt to lease IP addresses. Thus, DHCP servers in traditional DRNs have different network settings than the DHCP server of the primary network.

Conflicts that would normally occur between network components/devices of the primary network and network components/devices of the secondary backup network are avoided by disabling network components/devices on the streamlined backup network 14 that may conflict with one or more network components/devices of the primary network 12. The disabled network components/devices are then enabled when the streamlined backup network 14 is switched into the test mode and isolated from the live production environment 20, or in the event a real disaster occurs that prevents the primary network 12 from providing access to the critical data and services.

For example, and as shown in FIG. 4, when the system 10 is in the production mode, the load balancer 74 is disabled by disabling VLan 140. Likewise, the DNS servers 114 and DHCP server 112 are disabled by disabling VLan 142. However, the load balancer 74, DNS servers 114 and DHCP server 112 may remain powered on. Therefore, the load balancer 74, DNS servers 114 and DHCP server 112 of the streamlined backup network 14 are physically and/or logically prevented from communicating with the primary network 12. This prevents the DNS servers 114 of the streamlined backup network 14, which mirror the DNS server 98 of the primary network 14, from responding to DNS queries. Similarly, the DHCP server 112 of the streamlined backup network 14, which mirrors the DHCP server 94 of the primary network 12, is prevented from leasing IP addresses that may conflict with IP addresses leased by the DHCP server 94 of the primary network 12. Thus, DNS server 114 and the DHCP server 112 of the streamlined backup network 14 can have the exact same network configuration settings as the DNS server 98 and the DHCP server 94 of the primary network 12, respectively.

Figure 6:
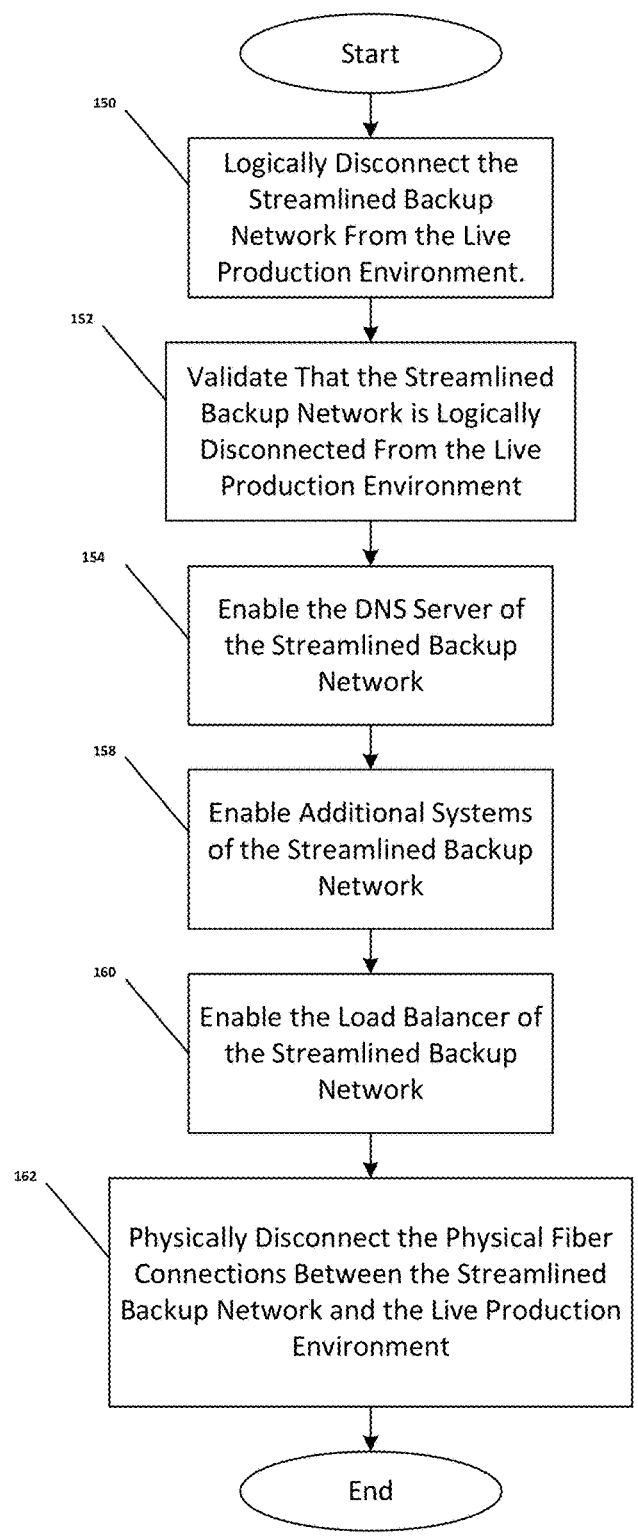
FIG. 6 is a flow chart depicting a process for switching system of FIG. 1 into the test mode.

As shown in FIGS. 5 and 6, the system 10 may be switched to the test mode according to the process shown by steps 150-162.

At step 150 the streamlined backup network 14 is logically disconnected from the primary network 12. Specifically, the external network connections 144 and 148 of blocks 130 and 132, respectively, are disabled which in turn physically and/or logically prevents the primary network 12 and the streamlined backup network 14 from communicating with each other. This may be accomplished by logging into the core routers/switches 34 and logically shutting down the external network interfaces 122 providing the external network connections 144 and 148 of blocks 130 and 132, respectively. Alternatively, the external network connections 144 and 148 of blocks 130 and 132, respectively, may be logically disabled by logging into the distribution routers/switches 124 and 128. Thus, the streamlined backup network 14 is logically isolated from the live production environment 20 and the primary network 12 continues to provide users (shown as 54 in FIGS. 1 and 2) access to critical data and critical services. Moreover, the data 38 and service 40 servers of the primary network 12 continue to be the primary data and service servers in the live production environment 20. The load balancer 42 of the primary network continues to distribute network traffic within the primary network 12. The core routers/switches 34 continue to communicate with the data 38 and service 40 servers and the load balancer 42.

At step 152, the streamlined backup network 14 is validated as being logically disconnected from the primary network 12. This may be accomplished by using a VPN (shown as 28 in FIG. 2) to remotely access the distribution routers/switches 124 and 128 and verify that only network routing paths belonging to the streamlined backup network 14 populate the routing tables of the distribution routers 124 and 128.

At step 154, the DNS server 114 of the streamlined backup network 14 is enabled. This may be accomplished by enabling VLan 142. As shown by arrow 151, if needed, a mirror image of the DNS server 98 of the primary network 12 is loaded into the DNS server 114 of the streamlined backup network 14. Thus the DNS server 114 of the streamlined backup network 14 is able to respond to DNS queries. Accordingly, DNS continuity is maintained between the primary network 12 and the streamlined backup network 14 when the streamlined backup network 14 is isolated from the live production environment 20. Further, as shown in FIG. 5, if the DHCP server 112 is integrated with the DNS server 114, then enabling VLan 142 will also enable the DHCP server 112. Thus, the DHCP server 112 of the streamlined backup network 14 is able to lease IP addresses to network components/devices on the streamlined backup network 14.

At step 158, additional systems (not shown), such as a mainframe, may be enabled. This may be accomplished by connecting the additional systems into the one or more blocks of the streamlined backup network 14 via VLans and disabling/enabling those VLans in the same manner as the DNS servers 114 and VLan 142. Further, as shown by arrow 153, the ADS server 118 of the streamlined backup network 14 may made a primary domain controller of a replicated forest of the active directory forest of which the ADS server 100 of the primary network 14 is the primary domain controller.

At step 160, the load balancer 74 of the streamlined backup network 14 is enabled. This may be accomplished by enabling VLan 140. As shown by arrow 155, if needed, a mirror image of the load balancer 42 of the primary network 12 is loaded into the load balancer 74 of the streamlined backup network 14.

At step 162, the physical connections between the streamlined backup network 14 and the primary network 12 (e.g., fiber optics transceivers that form the external network connections 144 and 148 of blocks 130 and 132, respectively, with the external network interfaces 122 of the core routers/switches 34 of the primary network 12) may be physically disconnected. Physically disabling the physical connections between the streamlined backup network 14 and the primary network 12 serves as a safeguard against having the streamlined backup network 14 accidentally join the live production environment 20 during the testing of the streamlined backup network 14.

Figure 7:
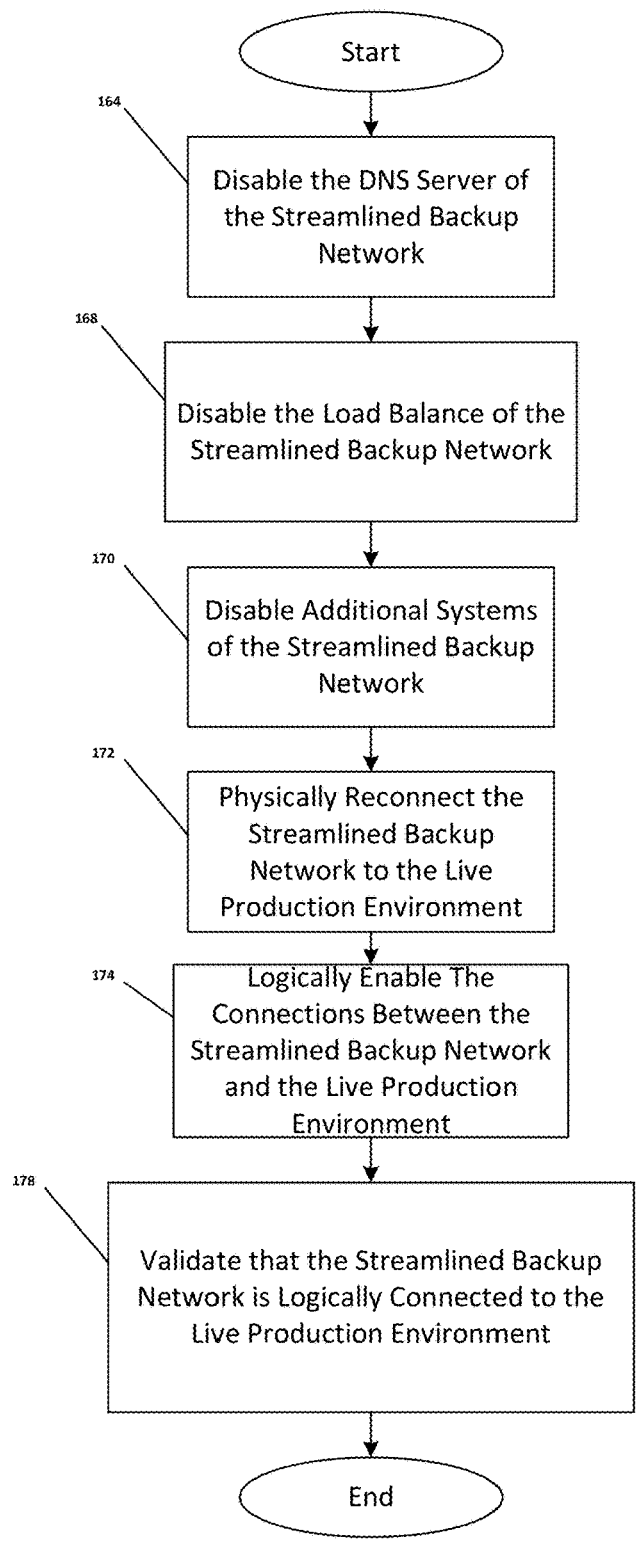
FIG. 7 is a flow chart depicting a process for switching the system of FIG. 1 into the production mode.

Referring to FIGS. 4 and 7, the system 10 may be switched back to the production mode according to the process shown by steps 164-178.

At step 164, the DNS servers 114 of the streamlined backup network 14 are disabled. This may be accomplished by disabling VLan 142. If the DHCP server 112 is integrated with the DNS server 114, then disabling VLan 142 will also disable the DHCP server 112. Accordingly, potential conflicts between the DNS 98 and DHCP 94 servers of the primary network 12 and the DNS 114 and DHCP 112 servers of the streamlined backup network 14 are avoided when the system 10 is in the production mode.

At step 168, the load balancer 74 of the streamlined backup network 14 is disabled. This may be accomplished by disabling VLan 140.

At step 170, additional systems (not shown), such as a mainframe, may be disabled. This may be accomplished by disabling the VLans that may connect the additional systems to distribution routers 124 or 128. Further, the ADS server 118 of the streamlined backup network 14 is made a secondary backup domain controller of the active directory forest of which the ADS server 100 of the primary network 12 is the primary domain controller.

At step 172, the physical connections between the streamlined backup network 14 and the primary network 12 (e.g., fiber optics transceivers that form the external network connections 144 and 148 of blocks 130 and 132, respectively, with the external network interfaces 122 of the core routers/switches 34 of the primary network 12), if previously disconnected, are physically reconnected.

At step 174 the streamlined backup network 14 is logically reconnected to the primary network 12. Specifically, the external network connections of 144 and 148 of blocks 130 and 132, respectively, are enabled which in turn allows the primary network 12 and the streamlined backup network 14 to communicate with each other. This may be accomplished by logging into the core routers/switches 34 and logically turning on the external network interfaces 122 providing the external network connections 144 and 148 of blocks 130 and 132, respectively. Alternatively, the external network connections 144 and 148 of blocks 130 and 132, respectively, may be logically enabled by logging into the distribution routers/switches 124 and 128. Thus, the streamlined backup network 14 is logically connected to the primary network 12 and the primary network 12 continues to provide users (shown as 54 in FIGS. 1 and 2) access to critical data and critical services. Moreover, the data 38 and service 40 servers of the primary network 12 continue to be the primary data and service servers in the live production environment 20. The load balancer 42 of the primary network continues to distribute network traffic within the primary network 12. The internal routers/switches 34 continue to communicate with the data 38 and service 40 servers and the load balancer 42.

At step 178, the streamlined backup network 14 is validated as being logically connected to the primary network 20. This may be accomplished by using a VPN (shown as 28 in FIG. 2) to remotely access the distribution routers/switches 124 and 128 of the streamlined backup network 14 and verify that the proper network routing paths between the primary network 12 and the streamlined backup network 14 populate the routing tables of the distribution routers/switches 124 and 128. Accordingly, after being logically and physically connected to the primary network 12, the streamlined backup network 14 forms part of the live production environment 20.

Referring back to FIG. 2, when the system 10 is in the test mode, a testing system 22 can run various reliability tests on the streamlined backup network 14. Such tests may include: operations tests, which gage the ability of users 54 to gain access to the streamlined backup network 14; functional tests, which insure that the data server 70 and the service server 72 of the streamlined backup network 14 are accessible and that they behave as expected; and integration tests, which test the ability of the streamlined backup network 14 to work with new and/or experimental systems (not shown) that may eventually be integrated into the live production environment 20. The streamlined backup network 14 may also be tested for recovery time objectives ("RTO") and recovery point objectives ("RPO"). In particular, the streamlined backup network 14 may be tested to verify that the streamlined backup network 14 provides access to critical data and critical services, such as ADS, DFS and email, within twelve (12) hours.

Additionally, in event the primary network 12 is unable to provide users 54 access to the critical data and critical services while the system 10 is in the test mode (shown in FIGS. 2 and 5), the system 10 can be switched back to the production mode (shown in FIGS. 1 and 4) wherein the transition from test mode to production mode is completed within four (4) hours.

As previously mentioned, switching is the ability to physically and logically isolate the streamlined backup network 14 from the live production environment 20 without the need to manually change the wiring and system configurations of every network components/devices that comprise the streamlined backup network 14. Specifically, the architecture of the streamlined backup network 14, as described above, provides for the ability to quickly switch between the production mode (shown in FIGS. 1 and 4) and the test mode (shown in FIGS. 2 and 5) by grouping particular network components/devices (as outlined above) into blocks. More specifically, as described above, the ability of the network components/devices of the streamlined backup network 14 to function/communicate can be altered without manually changing their wiring and/or system configurations by enabling and disabling the blocks into which they are grouped. In turn, by altering the network components/devices in such a manner, the architecture/functionality of the streamlined backup network 14 may be altered to achieve the desired network architecture/functionality required for the production mode (shown in FIGS. 1 and 4) and test mode (shown in FIGS. 2 and 5).

Thus, because the streamlined backup network 14 can be switched between the production mode (shown in FIGS. 1 and 4) and the test mode (shown in FIGS. 2 and 5), the reliability of the streamlined backup network 14 to provide the one or more users 54 access to critical data and critical services, in the event the primary network 12 is to provide users access to critical data and critical services, can be tested in an isolated environment using the streamlined backup network 14 using virtually the same configuration that the streamlined backup network 14 has when the streamlined backup network 14 forms part of the live production environment 20.

Figure 8:
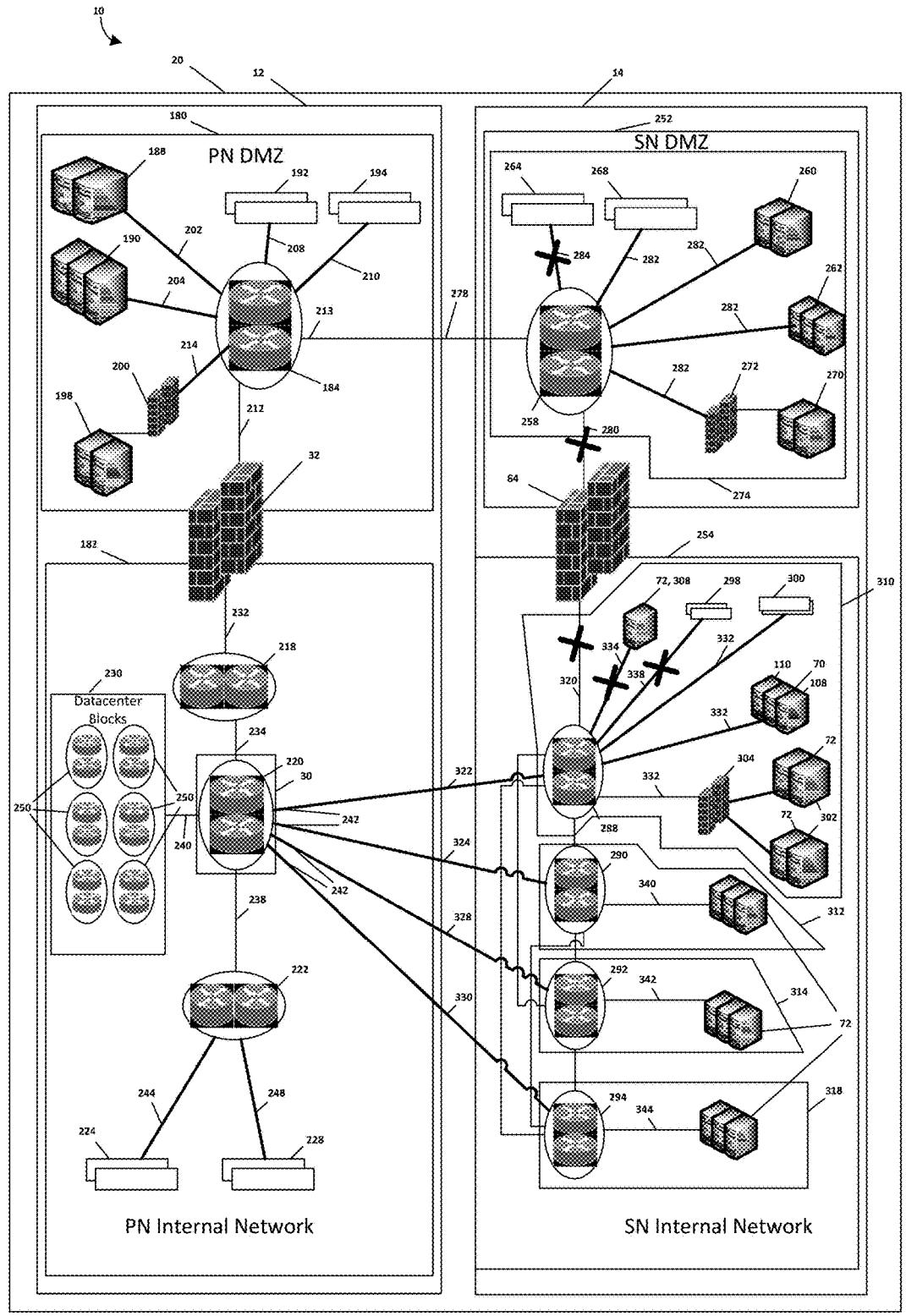
FIG. 8 is a more detailed block diagram of the system of FIG. 1 in a production mode, the system including a DMZ.
Figure 9:
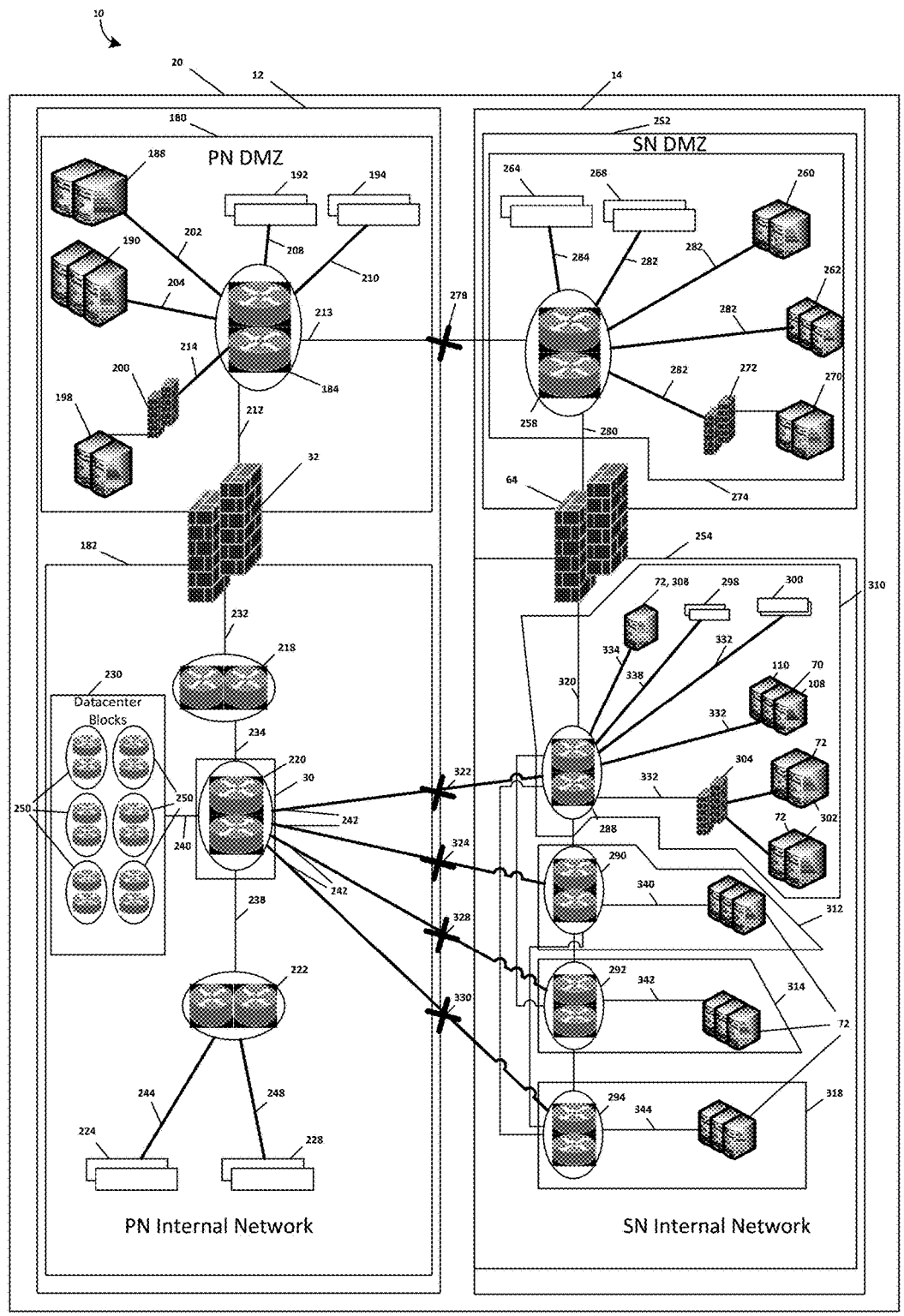
FIG. 9 is a more detailed block diagram of the system of FIG. 1 in a test mode, the system including a DMZ.

FIGS. 8 and 9 show another exemplary system 10 for providing disaster recovery capabilities and an isolated testing model according to an embodiment of the present invention. As shown in FIGS. 8 and 9, the primary network 12 includes a DMZ 180 that communicates with an internal network 182 located behind an external gateway devices 32.

The DMZ 180 of the primary network 12 includes, at least one distribution router/switch 184, a DMZ DNS 188, at least one DMZ server 190, a DMZ global load balancer 192 and a DMZ load balancer 194. The DMZ 180 of the primary network 12 may further include a payment card industry ("PCI") server 198 located behind a PCI firewall 200.

The distribution router/switch 184 of the DMZ 180 of the primary network 12 communicates with the DMZ DNS servers 188, DMZ servers 190, DMZ global load balancer 192, DMZ load balancer 194 and the external gateway device 32 via network connections 202, 204, 208, 210 and 212. The distribution router/switch 184 includes external network interfaces 213 that are configured to communicate with the streamlined backup network 14. The distribution router/switch 184 may further communicate with the PCI server 198 via network connection 214.

The DMZ DNS 188 of the DMZ 180 of the primary network 12 provides authoritative DNS responses to DNS queries by external users (not shown).

The DMZ servers 190 of the DMZ 180 of the primary network 12 provide external users access to data and services.

The DMZ global load balancer 192 and the DMZ load balancer 194 of the DMZ 180 of the primary network 12 distribute traffic within the DMZ 180.

The internal network 182 of the primary network 12 includes at least one internal router 218, at least one core router 220, at least one block distribution router 222, a global load balancer 224 a load balancer 228 and a data center 230. The internal routers 218 of the internal network 182 of the primary network 12 communicate with the core routers 220 and the external gateway device 32 via network connections 232 and 234. The core routers 220 of the internal network 182 of the primary network 12 communicate with the block distribution routers 222 and the data center 230 via network connections 238 and 240. The core routers 220 include external network interfaces 242 that are configured to communicate with the streamlined backup network 14. Thus, the core routers 220 are equivalent to the core routers (shown as 34 in FIGS. 4 and 5) in that they may also serve as the isolation appliance 30. The block distribution routers 222 communicate with the global load balancer 224 and the load balancer 228 via network connections 244 and 248. The data center 230 may include at least one block 250.

As also shown in FIGS. 8 and 9, the streamlined backup network 14 includes a DMZ 252 that communicates with an internal network 254 located behind an external gateway devices 64. The DMZ 252 of the streamlined backup network 14 includes at least one distribution router 258, a DMZ DNS 260, at least one or more DMZ servers 262, a DMZ global load balancer 264 and a DMZ load balancer 268. The DMZ 252 of the streamlined backup network 14 may further include a payment card industry ("PCI") server 270 located behind a PCI firewall 272. The distribution routers 258 form block 274 that has external network connections 278 and 280 that are configured to communicate with the distribution routers 184 of the DMZ 180 of the primary network 12 and the external gateway device 64 of the streamlined backup network 14, respectively. The DMZ load balancer 268, DMZ DNS 260, one or more DMZ servers 262, PCI firewall 272, and PCI server 270 are grouped in to block 274 via the internal network interfaces 282 of the distribution router/switch 258. The DMZ global load balancer 264 is grouped into block 274 via VLan 284.

The DMZ DNS server 260 of the DMZ 252 of the streamlined backup network 14 mirrors the DMZ DNS server 188 of the DMZ 180 of the primary network 12.

The DMZ servers 262 of the DMZ 252 of the streamlined backup network 14 mirror the DMZ servers 190 of the DMZ 180 of the primary network 12.

The internal network 254 of the streamlined backup network 14 includes at least one distribution router 288, 290, 292 and 294, at least one data server 70, at least one service server 72, a global load balancer 298 and a load balancer 300. The data servers 70 of the internal network 254 of the streamlined backup network 14 include a NAS 108 and a SAN 110. The service servers 72 of the internal network 254 of the streamlined backup network 14 include at least one PCI server 302 located behind a PCI firewall 304 and a DNS server 308. The distribution routers 288, 290, 292 and 294 form blocks 310, 312, 314 and 318, respectively. Distribution router 288 includes external network connections 320 and 322 that are configured to communicate with the gateway device 64 and the core router 220 of the internal network 182 of the primary network 12, respectively. Distribution routers 290, 292 and 294 include external network connections 324, 328 and 330, respectively, that are configured to communicate with the core routers 220 of the internal network 182 of the primary network 12. The distribution routers/switches 290, 292 and 294 may communicate with the gateway device 64 by way of the external network connection 320 of distribution router 288. The data servers 70, load balancer 300, PCI servers 302 and PCI firewall 304 are grouped into block 310 via the internal network interfaces 332 of the distribution router 288 that forms block 310. The DNS server 308 and global load balancer 298 are connected to the distribution router 288 by Vlans 334 and 338, respectively. Additional service servers 72 of the streamlined network 14 may be grouped into blocks 312, 314 and 318 via the internal network interfaces 340, 342 and 344 of the distribution routers 290, 292 and 294, respectively.

The system configuration and the security policies of the external gateway device 64 of the streamlined backup network 14 are identical to those of the external gateway device 32 of the primary network 12.

As shown in FIG. 8, when the system 10 is in the production mode, the external network connections 278 of block 274 to the distribution routers/switches 184 of the DMZ 180 of the primary network 12 are enabled. Accordingly, the distribution routers/switches 184 of the DMZ 180 of the primary network 12 communicate with the distribution routers/switches 258 of the DMZ 252 of the streamlined backup network 14. However, the external network connection 280 of block 274 to the gateway device 64 is disabled. Further, to avoid potential conflicts between the global load balancers 264 and 192, VLan 284 is disabled. Thus, the global load balancer 264 of the DMZ 252 of the streamlined backup network 14 is unable to communicate with the DMZ 180 of the primary network 12.

As also shown in FIG. 8, the external network connections 322, 324, 328 and 330 of blocks 310, 312, 314 and 318 to the core router 220 of the internal network 182 of the primary network are enabled. Accordingly, the core routers 220 of the internal network 182 of the primary network 12 communicate with the distribution routers 288, 290, 292 and 294 of the internal network 254 of the streamlined backup network 14 as well as the network components/devices grouped into blocks 310, 312, 314 and 318. However, the external network connections of block 310 to the gateway device 64 are disabled. Further, in order to prevent potential conflicts, VLans 334 and 338 are disabled. Thus, DNS server 308 and the global load balancer 298 are prohibited from communicating with the primary network 12.

As shown in FIG. 9, when the system 10 is switched to the test mode, the external connection 278 of block 274 to the distribution router 184 of the DMZ 180 of the primary network 12 is disabled while the external connection 280 of block 274 to the gateway device 64 and VLan 284 is enabled. Thus, the distribution router 258 of the DMZ 252 of the streamlined backup network 14 is physically and logically prevented from communicating with the distribution router 184 of the DMZ 180 of the primary network 12. However, the distribution router 258, as well as the network components grouped into block 274, can communicate with the gateway device 64.

As also shown in FIG. 9, the external network connections 322, 324, 328 and 330 of blocks 310, 312, 314 and 318 that are connected to the core router 220 of the internal network 182 of the primary network 12 are disabled, while the external network connection 320 of block 310 to the gateway device 64 and VLans 334 and 338 are enabled. Accordingly, the distribution routers 288, 290, 292 and 294 of the internal network 254 of the streamlined backup network 14, as well as the network components/devices grouped into blocks 310, 312, 314 and 318 are physically and/or logically prevented from communicating with the core routers 220 of the internal network 182 of the primary network 12 and are in communication with the gateway device 64. Thus, the network components of the DMZ 252 of the streamlined backup network 14 can communicate with the network components of the internal network 254 of the streamlined backup network 14.

Referring back to FIGS. 1 and 2, the system 10 for providing disaster recovery capabilities and an isolated testing model includes the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the system 10 for providing disaster recovery capabilities and an isolated testing model may include at least one processor, system memory, including random access memory (RAM) and read-only memory (ROM), an input/output controller, and one or more data storage structures. All of these latter elements are in communication with the at least one processor to facilitate the operation of the system 10 for providing disaster recovery capabilities and an isolated testing model as discussed above. Suitable computer program code may be provided for executing numerous functions, including those discussed above in connection with the system 10 for providing disaster recovery capabilities and an isolated testing model, primary network 12, streamlined backup network 14, and an isolation appliance 30. The computer program code may also include program elements such as an operating system, a database management system and "device drivers" that allow the system 10 for providing disaster recovery capabilities and an isolated testing model, primary network 12, the streamlined network 14, and isolation appliance 30 to interface with computer peripheral devices (e.g., a video display, a keyboard, a computer mouse, etc.).

Elements in communication with each other need not be continually signaling or transmitting to each other. On the contrary, such elements need transmit to each other as necessary, may actually refrain from exchanging data most of the time, and may require several steps to be performed to establish a communication link therebetween.

The data storage structures such as memory discussed herein may comprise an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 for providing disaster recovery capabilities and an isolated testing model, the primary network 12, the streamlined backup network 14, and the isolation appliance 30 and/or one or more programs (e.g., computer program code and/or a computer program product) adapted to direct the system 10 for providing disaster recovery capabilities and an isolated testing model, the primary network 12, the streamlined network 14, and the isolation appliance 30 to switch between the production mode and the test mode according to the various embodiments discussed herein. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor of the system 10 for providing disaster recovery capabilities and an isolated testing model (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device (e.g., a server) can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

The systems and methods of the present application are particularly advantageous. For example, by using approximately the same network and configuration settings for the data servers 70 the service servers 72 and other network components/devices of the streamlined network 14, the system 10 for providing disaster recovery capabilities and an isolated testing model allows for the streamlined backup network 14 to be tested for reliability in an isolated environment using approximately the same overall configuration state that the streamlined backup network 14 has when the streamlined backup network 14 forms part of the live production environment 20. Thus, the results of a reliability test of the streamlined backup network 14, conducted while the streamlined backup network 14 is in the test mode (depicted in FIGS. 2 and 5), provide the business and/or organization (not shown) that relies on a computer network with a high level of certainty that the one or more users 54 will be able to access the critical data and services in the event the primary network 12 is unable to do so as the result of a disaster.

Further, because the data servers 70, the service servers 72 and the load balancers 74 of the streamlined backup network 14 are made primary servers/network components/devices after the blocks (shown as 130 and 132 in FIGS. 4 and 5) into which they are grouped are disabled, thereby logically and physically isolating the streamlined backup network 14 from the live production environment 20, the system 10 for providing disaster recovery capabilities and an isolated testing model allows for the reliability of the streamlined backup network 14 to be tested without interrupting the ability of the primary network 12 to provide users 54 access to critical data and services. This allows for the reliability of the streamlined backup network 14 to be tested during normal business hours, thus saving time and money as business and organizations operating the primary network 12 and/or the streamlined backup network 14 do not need to pay overtime and/or irregular hourly wages.

Further still, because the system 10 for providing disaster recovery capabilities and an isolated testing model can be switched between a production mode (shown in FIGS. 1 and 4) and a test mode (shown in FIGS. 2 and 5) without requiring the physical rewiring of hundreds of network devices, the amount and costs associated with testing the reliability of the streamlined backup network 14 are significantly less than the above mentioned traditional testing methods.

Although this invention has been shown and described with respect to detailed embodiments thereof, it will be understood by those skilled in the art that various changes in form and detail thereof may be made without departing from the spirit and the scope of the invention. With respect to the embodiments of the systems described herein, it will be understood by those skilled in the art that one or more system components/devices may be added, omitted or modified without departing from the spirit and the scope of the invention. With respect to the embodiments of the methods described herein, it will be understood by those skilled in the art that one or more steps may be omitted, modified or performed in a different order and that additional steps may be added without departing from the spirit and the scope of the invention.

What is claimed is:

1. A system for providing an isolated testing configuration for disaster recovery capabilities, comprising:
   a primary network comprising a first data server and a first service server that provide one or more users access to critical data and critical services;
   a streamlined backup network comprising a second data server and a second service server that also provide the one or more users access to the critical data and the critical services; and
   an isolation appliance comprising one or more switches establishing an external network connection between the primary network and the streamlined backup network;
   wherein the system is switched between
      a production mode wherein the primary network and the streamlined backup network form a live production environment wherein the streamlined backup network provides the one or more users backup access to the critical data and the critical services in the event the primary network is unable provide access to the critical data and the critical services, and
      a test mode wherein the streamlined backup network is removed from the live production environment by logically isolating the streamlined backup network from the primary network such that backup access to the critical data and the critical services on the streamlined backup network is tested without inhibiting the operation of the primary network;
   wherein, when the system is in the test mode, the isolation appliance prevents the second data server and the second service server from communicating with the primary network by physically disconnecting the external network connection at the isolation appliance to physically isolate the streamlined backup network from the primary network when the streamlined backup network is in the test mode; and
   wherein the second data server and the second service server have the same configuration in the test mode and in the production mode.

2. The system for providing an isolated testing configuration for disaster recovery capabilities of claim 1,
   wherein the second data server and the second service server of the streamlined backup network are configured into one or more blocks;
   wherein the external network connection of the streamlined backup network to the isolation appliance includes an external network connection physically connecting each of the one or more blocks to the isolation appliance whereby the one or more blocks of the streamlined backup network are connected to the live production environment; and wherein, when the system is in the test mode, the isolation appliance prevents the second data server and the second service server from communicating with the primary network by physically disabling the external network connection of each block to the isolation appliance.

3. The system for providing an isolated testing configuration for disaster recovery capabilities of claim 2, wherein the isolation appliance comprises one or more switches with one or more ports; and wherein the external network connections of the one or more blocks of the streamlined backup network physically connect to the one or more ports of the one or more switches of the isolation appliance; and wherein the isolation appliance physically disables the external network connection of each block to the one or more ports of the one or more switches of the isolation appliance to physically isolate the streamlined backup network from the primary network when the streamlined backup network is in the test mode.

4. The system for providing an isolated testing configuration for disaster recovery capabilities of claim 2, wherein, when the system is in the production mode, the isolation appliance enables the second data server and the second service server to communicate with the primary network by enabling the external network connection of each block.

5. The system for providing an isolated testing configuration for disaster recovery capabilities of claim 1, wherein the streamlined backup network further comprises a load balancer that generates a network traffic distribution by distributing network traffic to at least one of the second data server and the second service server, wherein the load balancer adapts the network traffic distribution based at least in part on whether the system is in the production mode or the test mode.

6. The system for providing an isolated testing configuration for disaster recovery capabilities of claim 1, wherein the first service server of the primary network and the second service server of the streamlined backup network each include:
an active directory server;
a domain name service server;
a dynamic host configuration protocol server; and
an application server.

7. The system for providing an isolated testing configuration for disaster recovery capabilities of claim 1, wherein the primary network and the streamlined backup network each comprises a demilitarized zone and an internal network.

8. The system for providing an isolated testing configuration for disaster recovery capabilities of claim 1, wherein a testing system is connected to the streamlined backup network when the system is in the test mode.

9. A streamlined backup network designed to provide an isolated testing configuration for disaster recovery capabilities, comprising:
a first data server and a first service server providing one or more users access to critical data and critical services;
wherein the streamlined backup network is configured to be connected to a primary network via an external network connection at an isolation appliance, the primary network comprising a second data server and a second service server for providing the one or more users access to the critical data and the critical services;
wherein the streamlined backup network is configured to switch between
a production mode wherein the primary network and the streamlined backup network form a live production environment, and the streamlined backup network provides the one or more users backup access to the critical data and the critical services in the event the primary network is unable to provide access to the critical data and the critical services, and
a test mode wherein the streamlined backup network is removed from the live production environment by isolating the streamlined backup network from the primary network such that backup access to the critical data and the critical services on the streamlined backup network is tested without inhibiting the operation of the primary network;
wherein, when the streamlined backup network is in the test mode, the isolation appliance prevents the first data server and first service server of the streamlined backup network from communicating with the primary network by physically disconnecting the external network connection at the isolation appliance to physically isolate the streamlined backup network from the primary network when the streamlined backup network is in the test mode; and
wherein the first data server and the first service server have the same configuration in the test mode and in the production mode.

10. The streamlined backup network designed to provide an isolated testing configuration for disaster recovery capabilities of claim 9, wherein the first data server and the first service server of the streamlined backup network are configured into one or more blocks;

wherein the external network connection of the streamlined backup network to the isolation appliance includes an external network connection physically connecting each of the one or more blocks to the isolation appliance whereby the one or more blocks of the streamlined backup network are connected to the live production environment; and wherein, when the streamlined backup network is in the test mode, the isolation appliance prevents the first data server and the first service server of the streamlined backup network from communicating with the primary network by physically disabling the external network connection of each block to the isolation appliance.

11. The streamlined backup network designed to provide an isolated testing configuration for disaster recovery capabilities of claim 10, wherein the isolation appliance comprises one or more switches with one or more ports; and wherein the external network connections of the one or more blocks of the streamlined backup network physically connect to the one or more ports of the one or more switches of the isolation appliance; and wherein the isolation appliance physically disables the external network connection of each block to the one or more ports of the one or more switches of the isolation appliance to physically isolate the streamlined backup network from the primary network when the streamlined backup network is in the test mode.

12. The streamlined backup network designed to provide an isolated testing configuration for disaster recovery capabilities of claim 10, wherein when the streamlined backup network is in the production mode, the isolation appliance enables the first data server and first service server of the streamlined backup network to communicate with the primary network by enabling the external network connection of each block.

13. The streamlined backup network designed to provide an isolated testing configuration for disaster recovery capabilities of claim 9, further comprising a load balancer that generates a network traffic distribution by distributing network traffic to at least one of the first data server and the first service server, wherein the load balancer adapts the network traffic distribution based at least in part on whether the streamlined backup network is in the production mode or the test mode.

14. The streamlined backup network designed to provide an isolated testing configuration for disaster recovery capabilities of claim 9, wherein the first service server of the streamlined backup network and the second service server of the primary network each include:
   an active directory server;
   a domain name service server;
   a dynamic host configuration protocol server; and
   an application server.

15. The streamlined backup network designed to provide an isolated testing configuration for disaster recovery capabilities of claim 9, wherein the streamlined backup network and the primary network each comprises a demilitarized zone and an internal network.

16. A primary network designed to provide an isolated testing configuration for disaster recovery capabilities, comprising:
   a first data server and a first service server providing one or more users access to critical data and critical services;
   wherein the primary network is configured to be connected to a streamlined backup network via an external network connection at an isolation appliance, the streamlined backup network comprising a second data server and a second service server for providing the one or more users access to the critical data and the critical services;
   wherein the primary network is configured to switch between
      a production mode wherein the primary network and the streamlined backup network form a live production environment, and the streamlined backup network provides the one or more users backup access to the critical data and the critical services in the event the primary network is unable to provide access to the critical data and the critical services, and
      a test mode wherein the streamlined backup network is removed from the live production environment by logically isolating the primary network from the streamlined backup network such that backup access to the critical data and the critical services on the streamlined backup network is tested without inhibiting the operation of the primary network;
   wherein, when the primary network is in the test mode, the isolation appliance prevents the first data server and first service server of the primary network from communicating with the streamlined backup network by physically disconnecting the external network connection at the isolation appliance to physically isolate the primary network from the streamlined backup network when the primary network is in the test mode; and
   wherein the second data server and the second service server have the same configuration in the test mode and in the production mode.

17. The primary network designed to provide an isolated testing configuration for disaster recovery capabilities of claim 16,
   wherein the second data server and the second service server of the streamlined backup network are configured into one or more blocks;
   wherein the external network connection of the streamlined backup network to the isolation appliance includes an external network connection physically connecting each of the one or more blocks to the isolation appliance whereby the one or more blocks of the streamlined backup network are connected to the live production environment; and
   wherein, when the primary network is in the test mode, the isolation appliance prevents the second data server and a second service server of the streamlined backup network from communicating with the primary network by physically disabling the external network connection of each block to the isolation appliance.

18. The primary network designed to provide an isolated testing configuration for disaster recovery capabilities of claim 16,
   wherein the isolation appliance comprises one or more switches with one or more ports; and wherein the external network connections of the one or more blocks of the streamlined backup network physically connect to the one or more ports of the one or more switches of the isolation appliance; and
   wherein the isolation appliance physically disables the external network connection of each block to the one or more ports of the one or more switches of the isolation appliance to physically isolate the streamlined backup network from the primary network when the streamlined backup network is in the test mode.

19. The primary network designed to provide an isolated testing configuration for disaster recovery capabilities of claim 18, wherein when the primary network is in the production mode, the isolation appliance enables the primary network to communicate with the second data server and second service server of the streamlined backup network by enabling the external network connection of each block.

20. The primary network designed to provide an isolated testing configuration for disaster recovery capabilities of claim 16, wherein the streamlined backup network further comprises a load balancer that generates a network traffic distribution by distributing network traffic to at least one of the second data server and the second service server, wherein the load balancer adapts the network traffic distribution based at least in part on whether the primary network is in the production mode or the test mode.

\* \* \* \* \*